(12) United States Patent
Perner

(10) Patent No.: US 6,856,721 B2
(45) Date of Patent: Feb. 15, 2005

(54) LIGHT GUIDE CONFIGURATION FOR SERIAL BI-DIRECTIONAL SIGNAL TRANSMISSION, OPTICAL CIRCUIT BOARD, AND FABRICATION METHOD

(75) Inventor: Martin Perner, München (DE)

(73) Assignee: Infineon Technologies AG, Munich (DE)

( * ) Notice: Subject to any disclaimer, the term of this patent is extended or adjusted under 35 U.S.C. 154(b) by 435 days.

(21) Appl. No.: 10/138,655

(22) Filed: May 3, 2002

(65) Prior Publication Data

US 2002/0164120 A1 Nov. 7, 2002

(30) Foreign Application Priority Data

May 3, 2001 (DE) .......................................... 101 21 530

(51) Int. Cl.[7] ................................................. G02B 6/28
(52) U.S. Cl. ............................ 385/24; 385/15; 359/118
(58) Field of Search .............................. 385/22, 24, 31, 385/36

(56) References Cited

U.S. PATENT DOCUMENTS 6,236,778 B1 * 5/2001 Laughlin ..................... 385/24
6,324,313 B1 * 11/2001 Allman et al. ................ 385/14
6,453,081 B1 * 9/2002 Trezza et al. ................. 385/14

FOREIGN PATENT DOCUMENTS

| DE | 42 08 278 A1 | 9/1993 |
| WO | WO 85/03179 | 7/1985 |

* cited by examiner

Primary Examiner—Phan T. H. Palmer
Assistant Examiner—Jennifer Doan
(74) Attorney, Agent, or Firm—Laurence A. Greenberg; Werner H. Stemer; Gregory L. Mayback

(57) ABSTRACT

A light guide configuration for serial bi-directional signal transmission includes an optical signal line for carrying electromagnetic radiation along a main direction of the line, optical accesses disposed along the main direction for coupling electromagnetic radiation in and out along a direction running substantially perpendicular to the main direction of the line, and diffusers disposed inside the optical signal line and allocated to an optical access, respectively. Each of the diffusers works in conjunction with the allocated optical access such that a portion of the radiation that is carried in the optical signal line can be coupled out of the optical signal line by the diffuser through the allocated optical access, and radiation entering through the optical access can be coupled into the optical signal line through the allocated diffuser. An optical circuit board having the configuration and a method for fabricating the optical circuit board are also provided.

25 Claims, 3 Drawing Sheets

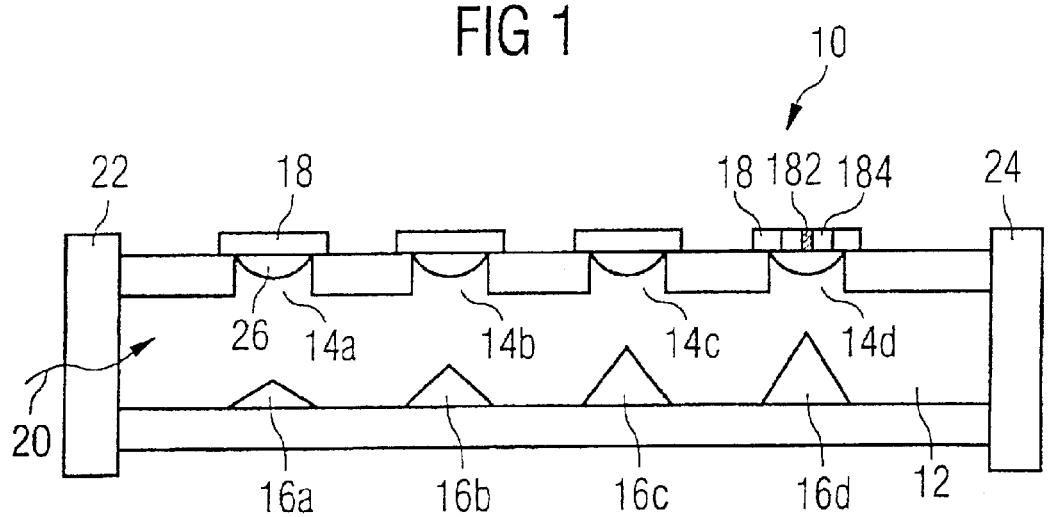
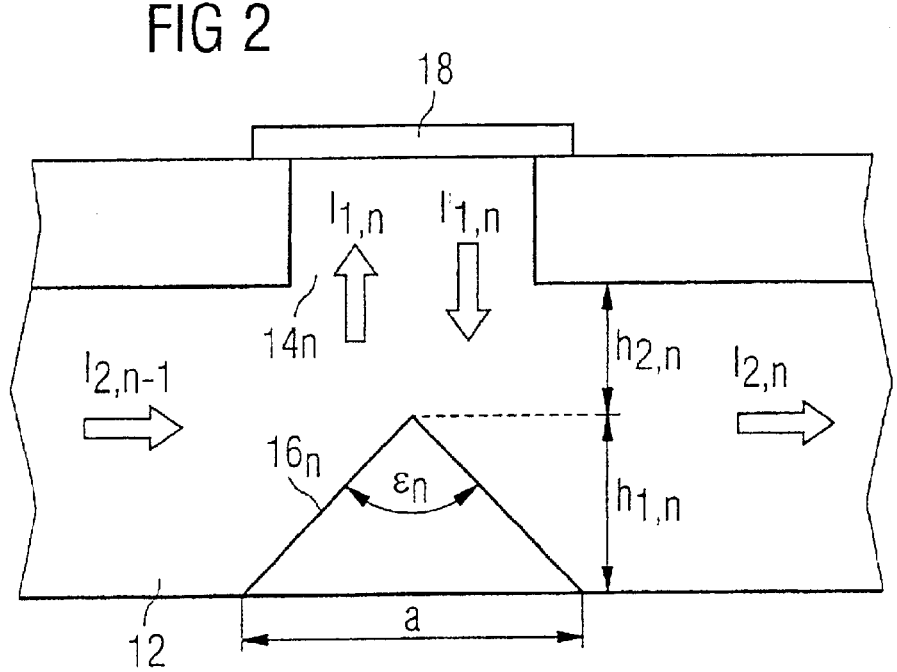

LIGHT GUIDE CONFIGURATION FOR SERIAL BI-DIRECTIONAL SIGNAL TRANSMISSION, OPTICAL CIRCUIT BOARD, AND FABRICATION METHOD

BACKGROUND OF THE INVENTION

Field of the Invention

The invention relates to the field of optical signal transmission. In particular, the invention relates to a light guide configuration for serial bi-directional signal transmission, an optical circuit board with a number of light guide configurations, and a method for fabricating an optical circuit board.

Electrical circuit boards for driving electronic components are pervasive in modern electronics. For many years the speed with which the components are driven has been steadily rising. Modern processors already run at clock rates above 1 GHz, and even for the relatively slow memory modules, clock rates of several 100 MHz have been planned and, in part, already realized.

With the rising speed of signal transmission, greater complications arise in purely electrical circuit boards. Whereas a parallel serial bus concept is easy to realize given low-frequency operation at a few MHz, a whole range of problems arise given high-frequency operation.

For instance, with parallel signal lines, the problem of crosstalk, whereby signal changes on one line induce noise signals on neighboring lines, grows worse at high frequencies. To correct such a problem, either the lines must be led a large distance apart, which reduces the achievable data parallelism, or expensive measures must be taken to shield adjoining lines.

Also, given signal transmission on longer signal paths with longer transit times, distortions of the signal shape occur, which must be corrected at great expense or taken into account in the layout of the circuit.

Overall, with electrical circuit boards, a larger configuration and fabrication outlay is required to guarantee that a signal or data transfer at high signal frequencies is noiseless and is adapted to the transit time.

To avoid such a problem, optical connections have been utilized. However, the optical connections are usually only unidirectional between an electro-optical signal emitter and an electro-optical signal receiver, and, therefore, they either do not permit a read/write operation, or they require two separate signal lines between the two terminal stations. Real bi-directional signal guidance between two stations that are able to function as transmitter and receiver has been associated with a large electro-optical circuit outlay.

In all the prior art methods, if the transmitted signals are tapped at several locations along the connection paths in series, a substantial signal degradation occurs, and, therefore, a multiple optical out-feed is possible only to a rather limited extent.

Furthermore, the effective optical coupling of light in and out of an optical line is at odds with the requirements of an optimally simple, noiseless bi-directional signal guidance, which is attributable to the wave character of the light and the associated directional transverse electromagnetic signal propagation. This problem is unknown to electrical signal guidance on purely electrical circuit boards, because electrical current can be coupled in and out of a current conductor at no great expense.

SUMMARY OF THE INVENTION

It is accordingly an object of the invention to provide a light guide configuration for serial bi-directional signal transmission, an optical circuit board, and a fabrication method that overcomes the hereinafore-mentioned disadvantages of the heretofore-known devices and methods of this general type and that that avoids the abovementioned disadvantages, and particularly that makes possible, in an easily realized way, a serial bi-directional signal transmission that is also suitable for the parallel transmission of high-frequency signals.

With the foregoing and other objects in view, there is provided, in accordance with the invention, a light guide configuration for serial bi-directional signal transmission, including an optical signal line having a main direction, the signal line carrying electromagnetic radiation along the main direction, a plurality of optical accesses disposed at the signal line along the main direction for coupling the electromagnetic radiation along a direction substantially perpendicular to the main direction, and a plurality of diffusers disposed inside the signal line, each of the diffusers respectively allocated to one of the optical accesses, and each of the diffusers carrying a portion of the electromagnetic radiation in the signal line to a respective one of the optical accesses for coupling the portion of the electromagnetic radiation out of the signal line from a respective one of the diffusers through the respective one of the optical accesses and for launching incident radiation arriving through a respective one of the optical accesses into the signal line through the respective one of the diffusers. Preferably, the optical accesses couple electromagnetic radiation into and out from the signal line.

Thus, the invention is based on the idea of providing diffusers for coupling light in and out in a bi-directional fashion in a light guide configuration that is tapped n times in series. Thus, of the optical signals propagating in the optical signal line, a portion is extracted by light diffusion, namely, in a direction running substantially perpendicular to the direction of propagation. Conversely, the diffusers can also serve to launch, by diffusion, light pulses that enter through the optical accesses.

In accordance with another feature of the invention, the shape and size of the plurality of diffusers are preferably tuned to one another such that, in the guiding of electromagnetic radiation in the optical signal line, the absolute value of the extracted radiation power is substantially constant for each optical access along the main direction of the line. A plurality of receivers that are provided in series along the light guide configuration can then be supplied with respective optical signals of equal intensity.

In accordance with a further feature of the invention, a further advantage is gained by tuning the shape and size of the plurality of diffusers to one another such that the relative proportion of launched radiation power is substantially equal for each optical access along the main direction of the line. The tuning guarantees that optical radiation is coupled into the light guide configuration with the same intensity regardless of which access it enters. It is particularly advantageous when the diffusers satisfy both these conditions.

In accordance with an added feature of the invention, the diffusers are fashioned as prisms. Preferably, the diffusers are formed by prisms of equal surface area. Such a configuration ensures that the launch power of the diffusers is equal regardless of the apex angle of the prisms. Then, the increasing extraction power is advantageously proportioned such that the increase in the share of extracted power compensates the decline in signal intensity along the direction of propagation due to the extracted partial beams. The absolute value of the extracted radiation power then remains constant despite the varied relative extraction power.

In accordance with an additional feature of the invention, each of the prisms has an apex angle and the apex angle of the prisms decreases along the main direction.

In accordance with yet another feature of the invention, a radiation sensor and/or a radiation emitter are provided at each of the respective optical accesses. The radiation sensor can pick up the radiation that is extracted through the optical access and convert it into an electrical signal for further processing by a useful circuit.

Conversely, electrical signals entering from outside at the optical access can control a radiation emitter, which outputs optical signals corresponding to the electrical signals and launches them into the light guide configuration through the appertaining diffuser.

In accordance with yet a further feature of the invention, the optical accesses are advantageously terminated by a microlens for bundling electromagnetic radiation. Depending on the requirements, the microlens can be a spherical lens, a half-lens, or some other concave or convex microlens. For instance, if a radiation sensor is located in the center of the cross-section of the optical access, a bundling of the radiation onto the center region by the microlens is expedient.

With the objects of the invention in view, there is also provided an optical circuit board having a number of such optical guide configurations according to the invention in a parallel configuration. It is possible to lead the signal lines closely parallel to each other because the optical signals in adjoining optical signal lines do not interfere with each other.

In accordance with yet an added feature of the invention, besides a circuit board containing the optical signal lines, the optical circuit board also includes a connected board containing optical ports. Preferably, the board is optically connected to the optical signal lines.

It has proven expedient when the top and/or bottom surface of the optical circuit board includes electrical connections for the current supply to electro-optical components that are disposed at the optical accesses.

It is considered particularly advantageous when the optical circuit board includes a board containing electrical interconnecting lines, which board is connected to the circuit board containing the optical signal lines.

In accordance with yet an additional feature of the invention, the optical circuit board can also include two such circuit boards containing electrical interconnection lines. In such a case, the circuit board containing the optical signal lines is preferably embedded midway between the two parallel electrically driven exterior boards. Electro-optical components that are soldered onto the optical circuit board can then communicate with the circuit board containing the optical signal lines through optical accesses in one or both of the exterior boards.

With the objects of the invention in view, there is also provided a method for fabricating an optical circuit board including the steps of creating a plurality of parallel trenches in a circuit board having at least two sides, the trenches having side surfaces, placing a reflection layer on the side surfaces of the trenches, generating optical signal lines by filling the trenches with a transparent vitreous material, creating v-shaped trenches perpendicular to the optical signal lines in at least one of the sides of the circuit board, generating diffusers in the optical signal lines by aluminizing the v-shaped trenches, and aluminizing the optical signal lines in regions except for optical access regions disposed opposite the v-shaped trenches.

In accordance with again another mode of the invention, the optical signal lines are aluminized in all regions except for optical access regions disposed opposite the v-shaped trenches.

In accordance with again a further mode of the invention, the circuit board containing the optical signal lines is preferably connected to a board containing optical ports.

In accordance with a concomitant mode of the invention, the circuit board containing the optical signal lines is preferably connected to a board containing electrical interconnection lines.

Other features that are considered as characteristic for the invention are set forth in the appended claims.

Although the invention is illustrated and described herein as embodied in a light guide configuration for serial bi-directional signal transmission, an optical circuit board, and a fabrication method, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a diagrammatic cross-sectional view of a light guide configuration according to the invention;

FIG. 2 is a fragmentary, diagrammatic, cross-sectional view of a diffuser and an allocated optical access of FIG. 1 for determining relative radiation intensities;

DESCRIPTION OF THE PREFERRED EMBODIMENTS

Figure 3:
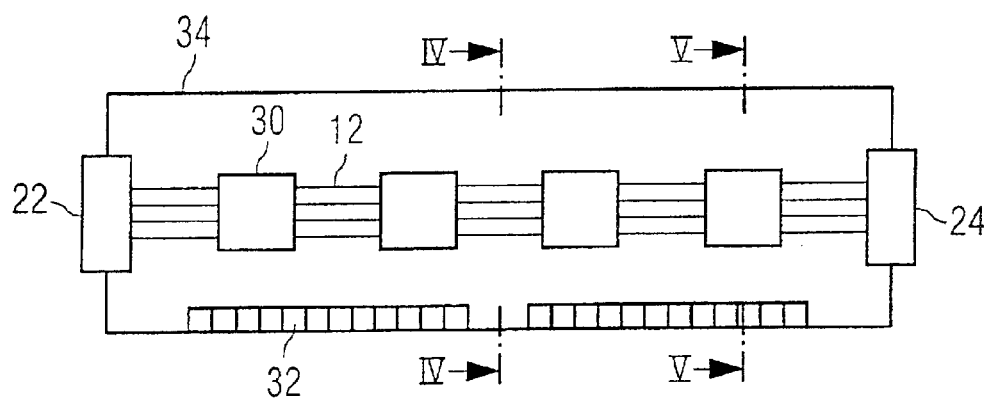
FIG. 3 is a plan view of an optical circuit board according to the invention.

Referring now to the figures of the drawings in detail and first, particularly to FIG. 1 thereof, there is shown a light guide configuration 10 into which an optical signal 20 is launched through an optical plug 22. The light signal 20 in FIG. 1 propagates in the optical signal line 12 from the left side to the right side of the configuration 10 and passes the optical accesses 14a to 14d in succession. The light propagation is therein determined by multiple diffusion at the reflective side surfaces of the signal line 12, i.e., it is substantially diffuse and not limited to one or a few modes.

Each of the optical accesses 14a to 14d has an allocated prism-shaped diffuser 16a to 16d, which is attached to a cladding surface of the optical signal line 12 opposite the input of the optical access. By the light diffusion at the prisms 16a to 16d, a part of the radiation intensity that is propagating in the optical signal line 12 is extracted into the optical accesses 14a to 14d and picked up by electro-optical contact pads 18.

Upon passing through the entire signal line 12, radiation is absorbed at the end thereof in an absorber 24, whereby a definite termination of the signal line is achieved, and disturbing back-reflections are avoided.

Each of the contact pads 18 contains an annular radiation sensor region 184, in which photodiodes that are configured in segments pick up the incident optical signals, convert them into corresponding electrical signals, and emit them for further processing by electrical components such as memory modules. Plano-convex microlenses 26 focus the incident radiation onto the radiation sensor region 184.

Furthermore, in the center of each of the contact pads 18 is an array of what are referred to as Vertical Cavity Surface Emitting Lasers (VCSELs), provided as radiation emitter region 182. The VCSEL array 182 converts electrical signals originating at the electrical components into corresponding optical signals. The emitted radiation is parallelized through the microlenses 26 and launched into the optical signal line 12 by diffusion at the prisms 16a to 16d.

The signal transmission in the light guide configuration is both bi-directional and serial. An input signal can be tapped at a plurality of optical accesses in succession (serially). Moreover, each access is set up for both receiving and sending optical signals (bi-directional transmission).

To guarantee an optimal transmission of the optical signals to the serially disposed accesses 14a to 14d and a constant launch power for all accesses 14a to 14d, the shape and size of the prisms 16a to 16d along the propagation direction of the optical signal line 12 are tuned to one another.

As indicated in FIG. 1, the prisms 16a to 16d have a constant surface area, but the apex angle declines along the direction of propagation; that is, the height level of the prisms rises from prism 16a to prism 16d across prisms 16b and 16c. Thus, an increasing relative proportion of the radiation 20 still propagating in the light guide is extracted through the prisms, which compensates the declining radiation power subsequent to each extraction.

On the other hand, the constant surface area of all the prisms 16a to 16d guarantees a constant launch power for each of the optical accesses 14a to 14d.

FIG. 2 illustrates the intensity relations for the propagation under the nth optical access $14_n$ of a series of serial optical accesses along a rectangular signal line 12. The optical access $14_n$ can be the $5^{th}$ access of a total of 16 accesses overall, for example.

The diffuser prism $16_n$ appertaining to the access $14_n$ has a rectangular surface area A=a*b, whereby b represents the width of the rectangular optical signal line 12, and has an apex angle $\epsilon_n$. The height $h_{1,n}$ of the prism is related in a conventional fashion by $\tan(s_n/2)=(a/2)/h_{1,n}$; i.e., the height $h_{1,n}$ rises as the apex angle declines. The free height of the signal line 12 above the prism $16_n$ is referenced $h_{2,n}$.

From the preceding optical access, a radiation intensity $I_{2,n-1}$ impinges upon the diffusion prism $16_n$. The intensity that is forwarded to the next optical access is referenced $I_{2,n}$; the intensity reflected to the optical access by the prism is referenced $I_n$; and the intensity that is reflected back by the contact pad 18 is referenced $I'_{1,n}$.

The requirement of an optimally constant extracted power, thus, means nothing more than:

$I_{1,n}$=const, for all n.

Thus, from simple geometric considerations, the following relationships are derived:

$I_{1,n}=I_{2,n-1}*(h_{1,n}/(h_{1,n}+h_{2,n}))$; and $I_{1,n}=I_{1,n}*R_n$;

hence, $I_{2,n}/I_{2,n-1}=(h_{1,n}/(h_{1,n}+h_{2,n}))*(1+R_n/2)$, where, $R_n$ represents the reflection power of the nth contact pad.

Thus, the height $h_{1,n}$ and, with it, the apex angle $\epsilon_n$ can be successively determined based upon the intensity $I_{2,0}$ that is initially launched into the light guide configuration, in that the condition $I_{1,n}$=const is satisfied. All that remains to be defined is the height of the first prism $h_{1,1}$ or the last prism $h_{1,N}$, such that an acceptable extracted intensity is achieved for all optical accesses.

Assuming for the sake of simplicity $R_n$=0, given n=8 optical accesses, a constant extraction intensity is achieved given $h_{1,1}:h_{2,1}=1:8$; $h_{1,2}:h_{2,2}=1:7$; $h_{1,3}:h_{2,3}=1:6$; . . . $h_{1,7}:h_{2,7}=1:2 h_{1,8}:h_{2,8}=1:1$. Thus, one-ninth of the launched power is extracted through each of the eight optical accesses $14_1$ to $14_8$, respectively, and the last ninth is absorbed in the absorber 24.

An exemplifying embodiment of an optical circuit board 34 with four parallel optical signal lines 12 is represented in FIG. 3. The optical signals that are launched through the optical plug 22 are guided out to corresponding terminals of the modules 30 (memory modules in this exemplifying embodiment) at each signal line 12 in series. FIG. 3 represents four memory modules in series, though fewer or more modules 30, for instance 8, 16, or 32, are also imaginable. Electrical signals, for supplying current to the electro-optical components among other purposes, are supplied through electrical contacts 32.

Figure 4:
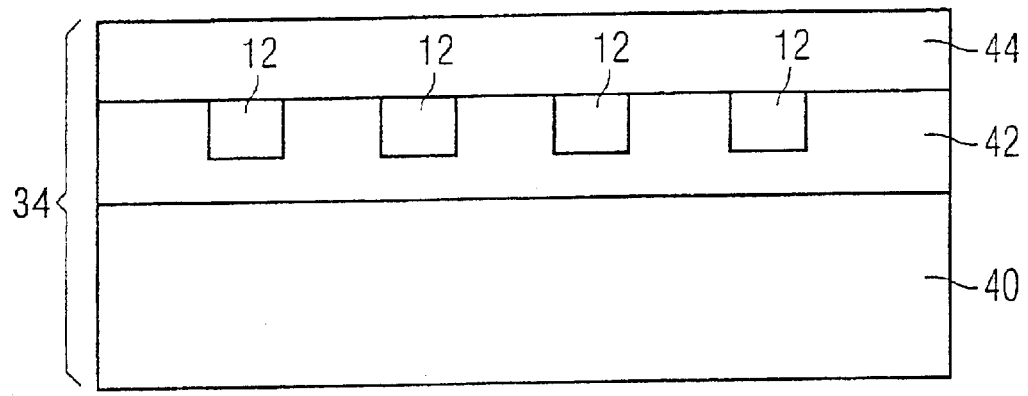
FIG. 4 is a diagrammatic, cross-sectional view of the optical circuit board of FIG. 3 along line IV—IV.
Figure 5:
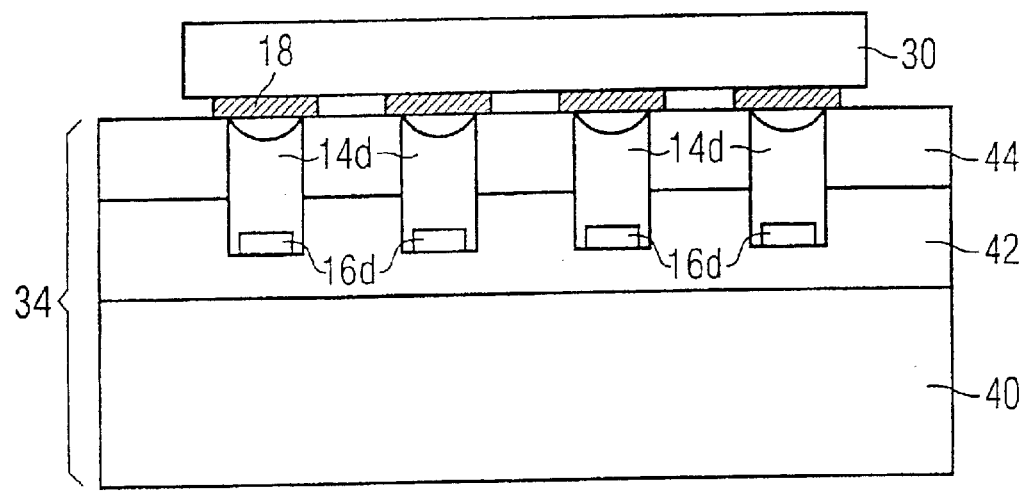
FIG. 5 is a diagrammatic, cross-sectional view of the optical circuit board of FIG. 3 along line V—V.

The sections along the lines IV—IV and V—V of FIG. 3 reveal the construction of the optical circuit board 34. See FIGS. 4 and 5. The circuit board 34 has three layers: a bottom circuit board 40, which contains electrical interconnection lines, a circuit board 42 containing the optical signal lines 12, and a top circuit board 44.

The top circuit board 44 terminates the optical signal lines between the optical accesses 14 in the upward direction. At each optical access 14 the top circuit board 44 includes a port, at the top of which are disposed the contact pads 18 that were described in connection with FIG. 1. Connected to the electrical outputs of the contact pads 18 are electrical inputs of a component 30. The connection is accomplished in a conventional fashion, for instance, through soldering balls that are attached to the inputs of the component 30.

Figure 6:
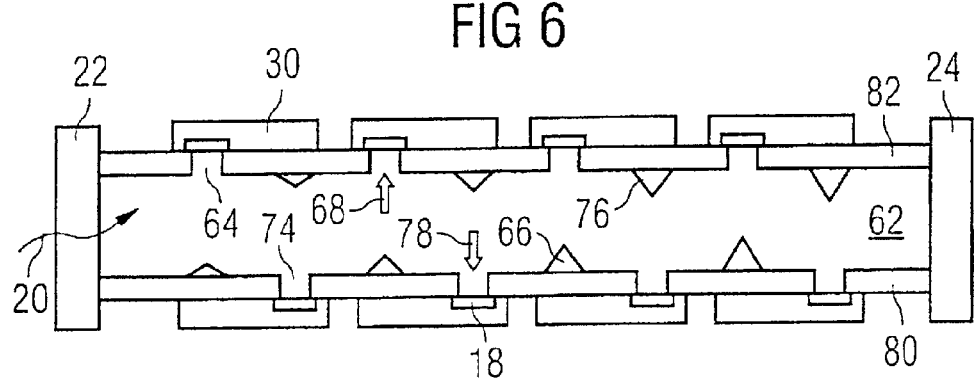
FIG. 6 is a diagrammatic, cross-sectional view of another embodiment of the light guide configuration according to the invention.

FIG. 6 represents another embodiment of the light guide configuration according to the invention, which differs from the configuration of FIG. 1 in that components 30, 34 are disposed on both sides of the optical signal line 62.

Accordingly, the optical signal line 62 includes optical accesses to the top (referenced 64) and to the bottom (referenced 74), these being perpendicular to the propagation direction of the radiation in the signal line 62. Disposed opposite the optical accesses 64, 74 (analogously to the configuration described in connection with FIG. 1) are diffuser prisms 66, 76, which extract a portion of the propagating radiation in the upward direction (referenced 68) or the downward direction (referenced 78) to the optical contact pads 18.

The top and bottom circuit boards 82, 80 include respective optical ports. Beyond this, at least one of the circuit boards is laid out to conduct electrical signals, particularly of supply voltages for electro-optical components.

In the fabrication of such optical circuit boards, electrical terminals and the required optical ports are generated in two boards that will later form the top and bottom of the optical circuit board. A number of parallel optical signal lines (for instance eight parallel signal lines) are cut in an additional board, and their interiors are coated with aluminum to form an insensitive reflection layer. Next, the interconnects are filled with plexi-glass or some other transparent self-hardening liquid glass. The top (and, given double-sided circuit boards, also the bottom) is polished.

Next, v-shaped trenches are cut perpendicular to the optical interconnects to generate the diffusion prisms. For a one-sided circuit board, the cut occurs on the bottom, and, for a double-sided circuit board, the cuts are on the bottom and the top. The v-shaped trenches are then aluminized like the optical signal line, with the exception of the optical access regions.

The three boards are then glued together, and the optical accesses are filled with liquid glass. Alternatively or additionally, microlenses may also be installed in the optical accesses.

I claim:

1. A light guide configuration for serial bi-directional signal transmission, comprising:
    an optical signal line having a main direction, said signal line carrying electromagnetic radiation along said main direction;
    a plurality of optical accesses disposed at said signal line along said main direction for coupling the electromagnetic radiation along a direction substantially perpendicular to said main direction; and
    a plurality of diffusers disposed inside said signal line, each of said diffusers respectively allocated to one of said optical accesses, and each of said diffusers carrying a portion of the electromagnetic radiation in said signal line to a respective one of said optical accesses for:
        coupling the portion of the electromagnetic radiation out of said signal line from a respective one of said diffusers through said respective one of said optical accesses; and
        launching incident radiation arriving through a respective one of said optical accesses into said signal line through said respective one of said diffusers.

2. The light guide configuration according to claim 1, wherein said optical accesses couple electromagnetic radiation into said signal line.

3. The light guide configuration according to claim 1, wherein said optical accesses couple electromagnetic radiation out from said signal line.

4. The light guide configuration according to claim 1, wherein:
    each of said diffusers has a shape and a size; and
    said shape and said size of each of said diffusers are tuned to said shape and said size of each other one of said diffusers to make an absolute value of an extracted radiation power substantially constant at each of said optical accesses along said main direction when the electromagnetic radiation is carried in said signal line.

5. The light guide configuration according to claim 4, wherein said shape and said size of each of said diffusers are tuned to one another to make a relative proportion of launched radiation power substantially equal for each one of said optical accesses along said main direction.

6. The light guide configuration according to claim 1, wherein each of said diffusers is a prism.

7. The light guide configuration according to claim 1, wherein:
    said diffusers are prisms each with a surface area; and
    said prisms each have the same surface area.

8. The light guide configuration according to claim 7, wherein:
    each of said prisms has an apex angle; and
    said apex angle of said prisms decreases along said main direction.

9. The light guide configuration according to claim 1, wherein:
    said diffusers are prisms each with an apex angle; and
    said apex angle of each of said prisms decreases along said main direction.

10. The light guide configuration according to claim 1, including a radiation device disposed at each of said optical accesses.

11. The light guide configuration according to claim 10, wherein said radiation device is at least one of the group consisting of a radiation sensor and a radiation emitter.

12. The light guide configuration according to claim 1, wherein each of said optical accesses has a microlens bundling the electromagnetic radiation.

13. The light guide configuration according to claim 1, wherein each of said optical accesses is terminated with a microlens bundling the electromagnetic radiation.

14. The light guide configuration according to claim 1, wherein:
    each of said optical accesses has a microlens; and
    said microlens terminates each of said optical accesses for bundling the electromagnetic radiation at said optical accesses.

15. An optical circuit board, comprising:
    a plurality of parallel light guide configurations each for serial bi-directional signal transmission, each of said light guide configurations having:
        an optical signal line having a main direction, said signal line carrying electromagnetic radiation along said main direction;
        a plurality of optical accesses disposed at said signal line along said main direction for coupling the electromagnetic radiation along a direction substantially perpendicular to said main direction; and
        a plurality of diffusers disposed inside said signal line, each of said diffusers respectively allocated to one of said optical accesses, and each of said diffusers carrying a portion of the electromagnetic radiation in said signal line to a respective one of said optical accesses for:
            coupling the portion of the electromagnetic radiation out of said signal line from a respective one of said diffusers through said respective one of said optical accesses; and
            launching incident radiation arriving through a respective one of said optical accesses into said signal line through said respective one of said diffusers.

16. The optical circuit board according to claim 15, including:
    a circuit board having optical signal lines; and
    a board having optical ports, said board optically connected to said optical signal lines.

17. The optical circuit board according to claims 16, including a further board having electrical interconnection lines, said further board connected to said circuit board.

18. The optical circuit board according to claim 15, including:

a circuit board having said optical signal lines; and a board having optical ports each optically connected to one of said optical signal lines.

19. The optical circuit board according to claims 18, including a further board having electrical interconnection lines, said further board connected to said circuit board.

20. The optical circuit board according to claim 15, wherein:

said optical accesses have respective electro-optical components;

a board assembly has a top side and a bottom side; and at least one of said top side and said bottom side has electrical connections respectively supplying current to said electro-optical components.

21. A method for fabricating an optical circuit board, which comprises:

creating a plurality of parallel trenches in a circuit board having at least two sides, the trenches having side surfaces;

placing a reflection layer on the side surfaces of the trenches;

generating optical signal lines by filling the trenches with a transparent vitreous material;

creating v-shaped trenches perpendicular to the optical signal lines in at least one of the sides of the circuit board;

generating diffusers in the optical signal lines by aluminizing the v-shaped trenches; and aluminizing the optical signal lines in regions except for optical access regions disposed opposite the v-shaped trenches.

22. The method according to claim 21, which further comprises aluminizing the optical signal lines in all regions except for optical access regions disposed opposite the v-shaped trenches.

23. The method according to claim 21, which further comprises connecting the circuit board having the optical signal lines to a board having optical ports.

24. The method according to claim 23, which further comprises connecting the circuit board having the optical signal lines to a board having electrical interconnection lines.

25. The method according to claim 21, which further comprises connecting the circuit board having the optical signal lines to a board having electrical interconnection lines.

* * * * *